United States Patent
Park

(10) Patent No.: US 9,298,343 B2
(45) Date of Patent: Mar. 29, 2016

(54) SYSTEM FOR PROVIDING VIRTUAL SPACE FOR INDIVIDUAL STEPS OF EXECUTING APPLICATION

(71) Applicant: Jong-ha Park, Seoul (KR)

(72) Inventor: Jong-ha Park, Seoul (KR)

( * ) Notice: Subject to any disclaimer, the term of this patent is extended or adjusted under 35 U.S.C. 154(b) by 0 days.

(21) Appl. No.: 14/633,710

(22) Filed: Feb. 27, 2015

(65) Prior Publication Data

US 2015/0169143 A1 Jun. 18, 2015

Related U.S. Application Data

(63) Continuation of application No. PCT/KR2014/005331, filed on Jun. 18, 2014.

(30) Foreign Application Priority Data

Jun. 20, 2013 (KR) .......................... 10-2013-0071051

(51) Int. Cl.
*G06F 15/16* (2006.01)
*G06F 3/0481* (2013.01)
*G06Q 10/10* (2012.01)
*G06F 9/455* (2006.01)
*G06F 9/54* (2006.01)
(Continued)

(52) U.S. Cl.
CPC .......... *G06F 3/0481* (2013.01); *G06F 9/45533* (2013.01); *G06F 9/54* (2013.01); *G06Q 10/10* (2013.01); *H04L 12/1822* (2013.01); *G06F 2009/45562* (2013.01)

(58) Field of Classification Search
USPC ........................... 709/203–205, 223–229, 250
See application file for complete search history.

(56) References Cited

U.S. PATENT DOCUMENTS

| 6,961,755 B2* | 11/2005 | Matsuda ................. H04L 67/38 709/204 |
| 2002/0002514 A1* | 1/2002 | Kamachi ................. G06Q 30/06 705/27.1 |
| 2008/0195956 A1 | 8/2008 | Baron et al. |

(Continued)

FOREIGN PATENT DOCUMENTS

| KR | 1020080086914 A | 9/2008 |
| KR | 1020090132346 A | 12/2009 |

(Continued)

OTHER PUBLICATIONS

International Search Report for PCT Application No. PCT/KR2014/005331, with English translation, dated Sep. 30, 2014, 5p.

(Continued)

*Primary Examiner* — Zarni Maung
(74) *Attorney, Agent, or Firm* — Brinks Gilson & Lione

(57) ABSTRACT

Provided is a virtual space providing system that may provide a virtual space to a terminal of at least one user, the system including a monitor configured to monitor whether an application or a program included in each terminal of the at least one user is executed and a real-time operation of the executed application or the program and output a result of the monitoring, a specifier configured to receive the output from the monitor, specify an individual step of the operation of the executed application, and output a request to generate a virtual space for the specified individual step, and a space generator configured to receive the output from the specifier and generate the virtual space for the specified individual step.

11 Claims, 4 Drawing Sheets

(51) Int. Cl.
*H04L 12/18* (2006.01)
*G06F 12/00* (2006.01)

(56) References Cited

U.S. PATENT DOCUMENTS

| | | | |
|---|---|---|---|
| 2013/0067485 A1* | 3/2013 | Shamilian | G06F 9/45533 718/104 |
| 2014/0047027 A1* | 2/2014 | Moyers | H04L 51/04 709/204 |
| 2015/0205484 A1* | 7/2015 | Morishita | G06F 3/012 382/103 |

FOREIGN PATENT DOCUMENTS

| | | |
|---|---|---|
| KR | 10-2012-0056111 | 6/2012 |
| WO | WO 2012/034044 A2 | 3/2012 |
| WO | 2012/092025 A2 | 7/2012 |
| WO | WO 2012-092025 A2 | 7/2012 |

OTHER PUBLICATIONS

Notice of Allowance issued by the Korean Patent Office on May 20, 2014 for the corresponding Korean Patent Application No. 10-2013-0071051 and its translations, 4 pgs.

* cited by examiner

SYSTEM FOR PROVIDING VIRTUAL SPACE FOR INDIVIDUAL STEPS OF EXECUTING APPLICATION

RELATED APPLICATIONS

This application is a continuation of Patent Cooperation Treaty (PCT) international application Serial No. PCT/KR2014/005331, filed on Jun. 18, 2014 and which designates the United States and claims priority to Korean Patent Application No. 10-2013-0071051, filed on Jun. 20, 2013. The entirety of both Patent Cooperation Treaty (PCT) international application Serial No. PCT/KR2014/005331 and Korean Patent Application No. 10-2013-0071051 are hereby incorporated by reference herein.

BACKGROUND OF THE INVENTION

The present invention relates to a virtual space providing system, and more particularly, to a virtual space providing system that may provide each user terminal with a virtual space for an individual step in execution of an application or a program.

The number of sites providing various contents, for example, Internet advertisements, online games, Internet newspapers and magazines, search services, portal services, and electronic commerce, is rapidly increasing. Recently, various social networking services such as Twitter and Facebook are thriving globally. Such services may contribute to solidifying personal connections with friends, mentors and protégés, and colleagues on the web and forming a wide human network by allowing a user to build up a new relationship.

A general social networking service may allow a user to write and post a piece of writing in a manner similar to writing and posting a piece of writing on a bulletin board. When the user inputs a piece of writing to a text input window and presses a post button, the input piece of writing may be posted on the web and other users may view and read the input piece of writing by accessing a corresponding website. The user may also attach a media file such as an image or a video to the piece of writing. When another user accesses a bulletin board on the website and selects a desired title from a list of pieces of writing, the user may view and read contents of a piece corresponding to the selected title on the web.

However, the general social networking service may be required to access a server providing such a service to allow the user to post or read information. Thus, sharing the information at an immediate point at which the user desires to share the information with other users may not be easy.

Also, procedures for joining the service, logging in, authentication, and the like may be necessary to post and read the information. In addition, when the service does not provide a corresponding frame, the user may not compose a piece of writing at an immediate point at which the user desires to submit the piece. Thus, users of the service may be subordinate to an administrator of the service.

Accordingly, there is a desire for a system to allow a user to directly specify an individual step of all programs or applications executed in a user terminal in addition to a web browser, generate an independent virtual space for the specified individual step, and use the generated virtual space for a personal purpose or sharing the virtual space with another user.

SUMMARY OF THE INVENTION

An aspect of the present invention provides a virtual space providing system that may provide a virtual space for each individual step in execution of an application or a program for an individual user or sharing with another user.

Another aspect of the present invention provides a virtual space providing system that may provide a virtual space for sharing or storing information at an immediate point at which the sharing of the information with another user or storing the information for an individual user is required during use of an application, without a process of accessing an additional website providing such a service for the sharing or the storing of the information.

Still another aspect of the present invention provides a virtual space providing system that may provide a virtual space for communication to general users or a personal virtual space to individual users, and enable a developer to focus on contents to be developed through the virtual space for the communication and the personal virtual space.

According to an aspect of the present invention, there is provided a virtual space providing system that provides a virtual space to at least one user using a terminal, the system including a monitor configured to monitor whether an application or a program included in each terminal of the at least one user is executed and a real time operation of the executed application and output a result of the monitoring, a specifier configured to receive the output from the monitor, specify an individual step of the operation of the executed application, and output a request to generate a virtual space for the specified individual step, and a space generator configured to receive the output from the specifier and generate the virtual space for the specified individual step. The individual step may be each state in which the operation of the executed application changes from a previous state. The monitor and the specifier may be included in a virtual space application to be executed in each terminal. The space generator may be included in a server located to be separate from the terminal. When an application executed in a terminal of any one of the at least one user is identical to the executed application or performs a function identical to a function of the executed application, and the identical application or the application performing the identical function is in an individual step identical to the specified individual step, the server may provide the generated virtual space to the virtual space application executed in the terminal of any one of the at least one user to share the generated virtual space with any one of the at least one user. The virtual space may be controlled through the virtual space application executed in each terminal of the at least one user.

The application may be a web browser, and the individual step may be each state in which the operation changes from the previous state after the web browser accesses each uniform resource locator (URL).

The virtual space may be controlled to be a space in which at least one of media including music, an image, or a video, and a bulletin board, a file transfer, a recommendation, and a non-recommendation is executed through the virtual space application.

The virtual space may be controlled to be a space in which a program for at least one of a voice chat, a video chat, and a video call to be provided to the at least one user is executed through the virtual space application.

When the executed application is a call application of the terminal and the individual step is a step in which a phone number of a contact is stored, the virtual space may be provided to the virtual space application executed in a terminal possessing the stored phone number of the contact.

The virtual space may be controlled to be a space in which at least one of media including music, an image, or a video, and a bulletin board, and a file transfer is executed through the virtual space application.

The specifier, the space generator, or the server may generate a unique address specifying the executed application and the individual step, or generate the unique address by modifying a unique web address when the executed application possesses the unique web address.

The virtual space application may receive an event occurring in the generated virtual space from the server, and provide the received event to any one of the at least one user sharing the provided virtual space. The event may be an action of providing data to another user sharing the virtual space through the virtual space application executed in the terminal of any one of the at least one user sharing the virtual space.

A notification on the received event may be provided through the virtual space application executed in a terminal of another user.

The notification may be provided in real time.

The server may set an access right for a portion of the at least one user sharing the virtual space to access the event. The virtual space application may provide the received event exclusively to the portion of the at least one user corresponding to the access right.

According to example embodiments of the present invention, a virtual space providing system may provide a virtual space for an individual step in execution of an application or a program, which may be used by an individual user or shared with another user.

In addition, the virtual space providing system may provide the virtual space for sharing or storing information at an immediate point in time at which the sharing and the storing of the information is required to share the information with another user or store the information for the user during use of the application, without a process of accessing an additional website providing such a service of sharing or storing the information.

Further, the virtual space providing system may provide general users with a virtual space for communication or a virtual space for personal use, and enable developers to focus on developing contents through the virtual space for communication and the virtual space for personal use.

DETAILED DESCRIPTION OF THE PREFERRED EMBODIMENTS

Figure 1:
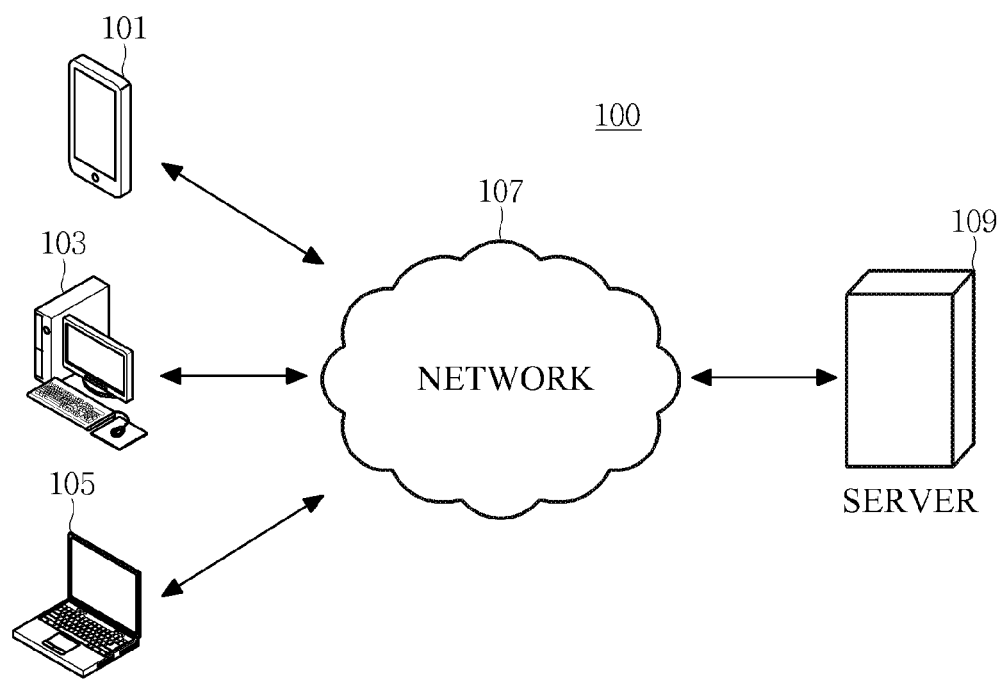
FIG. 1 is a diagram illustrating an example of a virtual space providing system according to an embodiment of the present invention.

Reference will now be made in detail to example embodiments of the present invention, examples of which are illustrated in the accompanying drawings, wherein like reference numerals refer to the like elements throughout. Example embodiments are described below to explain the present invention by referring to the accompanying drawings; however, the present invention is not limited thereto or restricted thereby.

When it is determined a detailed description related to a related known function or configuration that may make the purpose of the present invention unnecessarily ambiguous in describing the present invention, the detailed description will be omitted here. Also, terms used herein are defined to appropriately describe the example embodiments of the present invention and thus may be changed depending on a user, the intent of an operator, or a custom. Accordingly, the terms must be defined based on the following overall description of this specification.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Also, as used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

FIG. 1 is a diagram illustrating an example of a virtual space providing system 100 according to an embodiment of the present invention. Referring to FIG. 1, the virtual space providing system 100 includes a user terminal, a network 107 and a server 109.

The user terminal may include, for example, a wireless terminal 101, a desktop 103, and a laptop 105, which are generally used. For example, the wireless terminal 101 may be a device widely used in recent years, and includes a computing function that enables an execution of an application or a program in addition to a simple calling function. In general, the wireless terminal 101 may be a smartphone or a tablet personal computer (PC).

The network 107 may be a communication network that may connect, to the server 109, wired and wireless user terminals including the wireless terminal 101, the desktop 103, and the laptop 105. For example, the network 107 may be wired and wireless Internet network connection.

The server 109 may be implemented on the network 107, and transmit and receive data with the user terminal, for example, the wireless terminal 101, the desktop 103, and the laptop 105, through the network 107. The server 109 may be a web server through which an application or a program is executed.

According to an embodiment, the virtual space providing system 100 may broadly include the three components described in the foregoing and include, in detail, a monitor, a specifier, and a space generator.

The monitor may be included in a user terminal of a user, for example, the wireless terminal 101, the desktop 103, and the laptop 105, and monitor whether an application or a program included in the user terminal is executed. In addition, the monitor may monitor a real-time operation of the executed application.

For example, when a user executes a Naver® application (hereinafter referred to as a Naver® app) using a smartphone, which corresponds to the wireless terminal 101, of the user, a monitor included in the smartphone may detect an execution of the Naver® app and monitor, in real time, an individual step of an operation of the Naver® app, for example, reading a news article and performing a search through the Naver® app. Here, the individual step may refer to each state in which an operation of an application becomes different from a previous state. For example, when the application is a web browser, the individual step may be each step in which an Internet page provided to the user is turned. For another example, when the application is a call application, the individual step may be each step in which inputting a phone number is changed to displaying the phone call for the user to place a call.

In detail, each individual step may refer to each state in which a function or a task of the application is converted or changed from a previous sate to another state. Thus, the monitoring may be performed by specifying an individual step, for example, specifying which news article the user is reading among numerous news articles.

The monitor may be provided in a form of software such as an additional application, for example, a virtual space application, to be installed and executed in the user terminal, for example, the wireless terminal 101, the desktop 103, and the laptop 105.

The specifier may be provided in the user terminal, for example, the wireless terminal 101, the desktop 103, and the laptop 105, and receive an output from the monitor and specify an individual step of an operation of an application executed in the user terminal, for example, the wireless terminal 101, the desktop 103, and the laptop 105. Further, the specifier may output a request to generate a virtual space for the specified individual step.

To further describe the example of the Naver® app, when the user desires to share a news article, which is being viewed and read by the user through the Naver® app, or needs a personal space for a memo on the news article, various steps may be required to achieve the sharing and the personal space for the memo.

Conventionally, when the user desires to share the news article with another user, the user may be required to transmit, to another user, a uniform resource locator (URL) address that may invoke the news article. Thus, the user may be required to search for the URL address of the news article and copy the found URL address so as to be transmitted through a message or a messenger application.

However, according to an embodiment, the specifier included in the virtual space providing system 100 may specify an individual step of an operation of the Naver® app in which the news article currently being viewed by the user is executed. That is, the specifier may specify the individual step in which the news article that the user desires to share with another user is executed and thus, the user may not be required to search for the URL address to invoke the news article, copy the found URL address, and transmit the copied URL address to another user.

The specifier may be provided in a form of software such as an additional application, for example, the virtual space application, to be installed and executed in the user terminal, for example, the wireless terminal 101, the desktop 103, and the laptop 105.

The space generator may be included in the server 109 separate from the user terminal, for example, the wireless terminal 101, the desktop 103, and the laptop 105. The space generator may receive an output from the specifier, determine an individual step to which the specified individual step belongs, and generate a virtual space for the specified individual step.

To further describe the Naver® app example, the space generator may determine an individual step of the operation of the Naver® app in which the news article that the user desires to share with another user is executed, and generate a virtual space exclusively for the news article executed in the individual step.

The virtual space may be generated in the server 109 and possess a unique address distinguishable from other individual steps previously specified or to be subsequently specified. For example, when an individual step of executing a first display of the Naver® app is specified by the specifier, the specifier or the space generator may generate a unique address for the individual step of executing the first display of the Naver® app by using an URL address, for example, "[. . . ]/web/naver/http:/m.naver.com," through which the first display of the Naver® app is executed, in order to distinguish the individual step from other individual steps.

The generated virtual space may be a space used to execute multimedia such as music, an image, or a video, implement a bulletin board in which users executing the individual step may post a piece of writing or a comment, and recommend or not recommend the piece of writing or the comment, or execute a program through which users may transmit files for personal storage. In addition, the virtual space may be a space in which a program enabling a voice chat, a video chat, or a video call between users.

The generated virtual space may be provided exclusively to users executing a step identical to the individual step of the application specified for the virtual space to be generated. In detail, the generated virtual space may be provided to an additional application, for example, the virtual space application, executed in a user terminal of a user executing the step identical to the specified individual step of the application. For example, when a user desires to share a news article "A," which is being viewed by the user through the Naver® app, with another user, the space generator may generate a virtual space for the news article A by specifying an individual step of the Naver® app in which the news article A is executed. The generated virtual space may be provided to an additional application, for example, the virtual space application, which is being executed in user terminals of other users viewing the news article A. Thus, multimedia, a bulletin board, a file transfer, a voice or a video chat or a video call that are executed in the generated virtual space may be used or reached only by the users executing an individual step identical to the individual step, for example, the news article A, of the Naver® app.

When a new event occurs in the generated virtual space, the server 109 may transmit the event to the user terminal, for example, the wireless terminal 101, the desktop 103, and the laptop 105, of users executing an identical individual step. An object receiving the event may be an additional application, for example, the virtual space application being executed in the user terminal, for example, the wireless terminal 101, the desktop 103, and the laptop 105. The event may be, for example, an action of providing data from any one of the users to another user sharing the generated virtual space. For example, when a user desires to send a comment or an opinion on the news article A to another user, the data may be a piece of writing posted on a bulletin board or a comment on the piece posted on the bulletin board. Also, the data may correspond to an execution of multimedia, a file transfer, a voice or a video chat, or a video call and thus, a detailed description will be omitted here.

In addition, the server 109 may provide the generated virtual space to a portion of the users executing the step identical to the specified individual step of the application. Thus, the server 109 may additionally set an access right for the event occurring in the virtual space. The event for which the access right is set may be provided exclusively to users corresponding to the set access right.

The space generator may be provided in a form of software such an additional program in the server 109.

Figure 2:
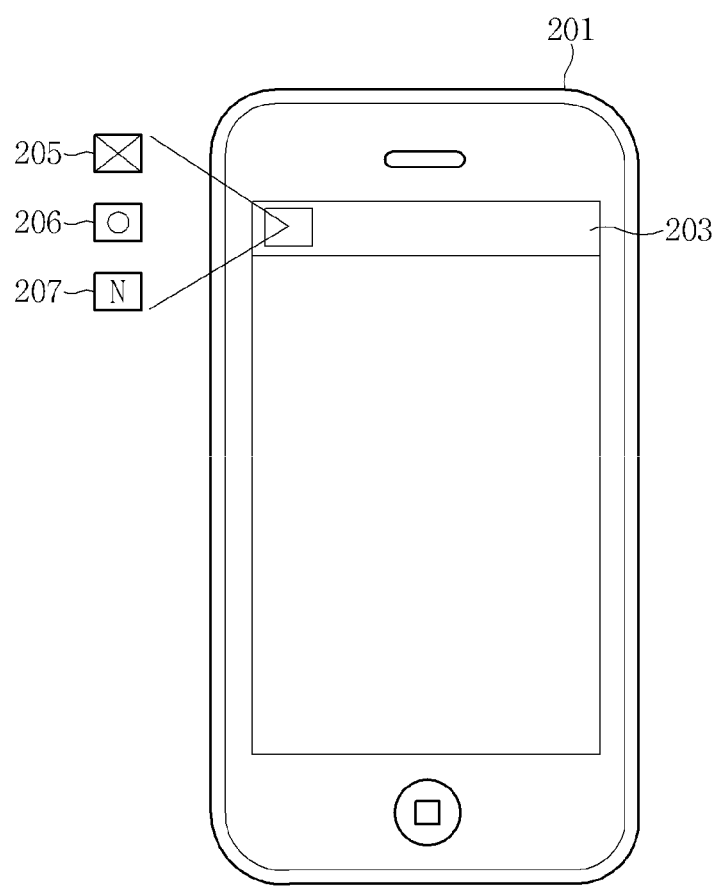
FIG. 2 is a diagram illustrating an example of a notification of an event to be provided in a status bar of a wireless terminal included in a virtual space providing system according to an embodiment of the present invention.
Figure 3:
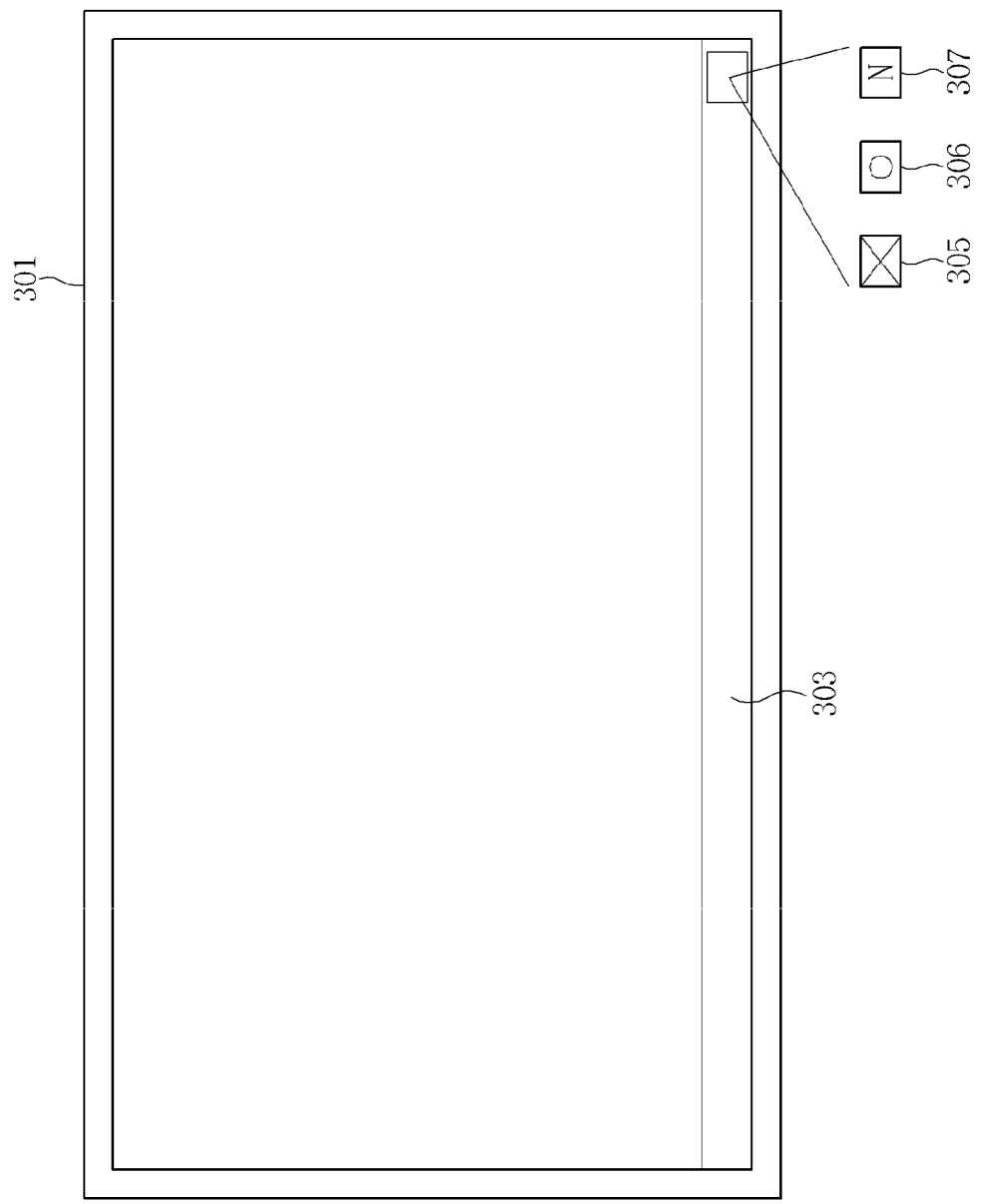
FIG. 3 is a diagram illustrating an example of a notification of an event to be provided in a status bar of a monitor of a desktop or a laptop include in a virtual space providing system according to an embodiment of the present invention.

FIG. 2 is a diagram illustrating an example of a notification of an event to be provided through an additional application, for example, a virtual space application, executed in a wireless terminal, for example, a smartphone 201, in a virtual space providing system according to an embodiment of the present invention. FIG. 3 is a diagram illustrating an example of a notification of an event to be provided to a monitor 301 of a desktop or a laptop in which an additional application, for example, a virtual space application, is executed in a virtual space providing system according to an embodiment of the present invention.

Referring to the examples of FIGS. 2 and 3, a status bar 203 is included in the smartphone 201 and a status bar 303 is included in the monitor 301 of the desktop or the laptop. However, the notification of the event may be provided in a form of a pop-up based on an operating system (OS) driven in the smartphone 201 and the desktop or the laptop. In addition, the notification of the event may be provided to a user visually, aurally, through sound, and tactilely, through vibration.

Referring to FIG. 2, when a new event occurs in a virtual space, the smartphone 201 receiving the event from a space generator may indicate three visual notifications on the status bar 203. A first notification 205 may indicate that the event does not occur in the virtual space. A second notification 206 may indicate that the event occurs in the virtual space. A third notification 207 may indicate that the new event is not recognized or verified by a user of the smartphone 201. Descriptions of the status bar 303, a first notification 305, a second notification 306, and a third notification 307 illustrated in FIG. 3 may be identical to the description provided with reference to FIG. 2 and thus, will be omitted here for brevity.

The first notifications 205 and 305, the second notifications 206 and 306, and the third notifications 207 and 307 illustrated in FIGS. 2 and 3 are provided only as illustrative examples and thus, the notification of the event implemented in the virtual space providing system according to an embodiment of the present invention may not be limited to the notifications described in the foregoing.

A variety of applications may be installed in a smartphone among user terminals, or installed through an application market as necessary. Numerous applications, for example, call application, a camera application, a gallery application used to provide stored images, a music application, and a memo application, may be installed in the smartphone. Such applications may be installed in a form of an additional program in a desktop or a laptop.

A detailed example of a virtual space providing system in which a user terminal is a smartphone and a call application is executed in the smartphone will be described with reference to FIG. 4.

Figure 4:
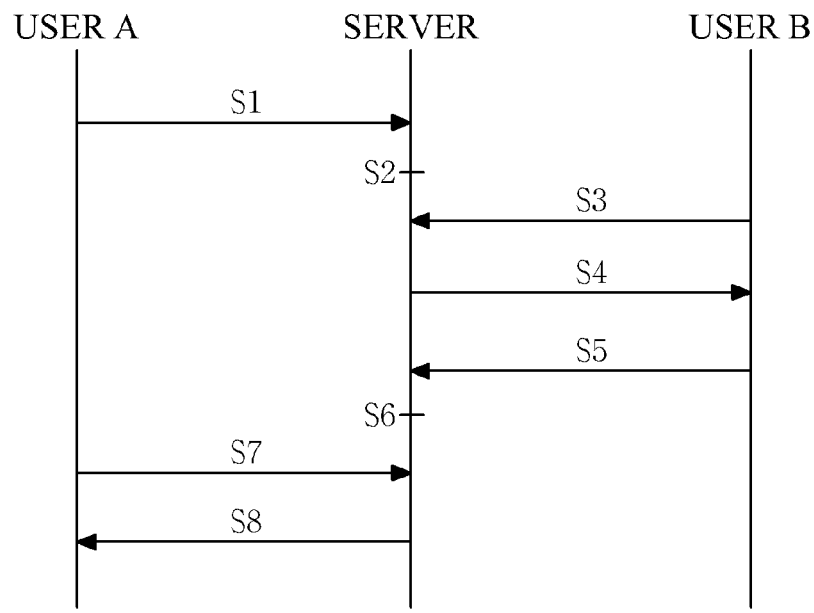
FIG. 4 is a diagram illustrating a flow of operations of a virtual space providing system according to an embodiment of the present invention.

FIG. 4 is a diagram illustrating a flow of operations of the virtual space providing system according to an embodiment of the present invention. Referring to FIG. 4, a user A shares a virtual space with a user B through a server.

The user A may execute the call application to place a call to a person. The user A may then input a phone number of the person through a keypad of the executed call application. Here, when the user A desires to share a virtual space with another user placing a call to the person by inputting the phone number of the person, the user A may specify an individual step in which the phone number of the person is being input to the call application using a specifier included in a virtual space application installed and executed in the smartphone of the virtual space providing system. In operation S1, the specified individual step is transmitted to the server including a space generator in response to an output of the specifier. Here, in operation S1, the user A may post a piece of writing while specifying the individual step.

In operation S2, the space generator included in the server generates a virtual space for the individual step in which the phone number of the person is being input to the call application.

In operation S3, when the user B executes the call application used by the user A and inputs the phone number of the person, which is a step identical to the individual step specified by the user A, a monitor included in the virtual space application installed and executed in a smartphone of the user B detects that the step is identical to the specified individual step and transmits a result of the detecting to the server.

In operation S4, when the server verifies that the user B is in the step identical to the specified individual step of the call application for which the virtual space is allowed to be generated, the server provides the generated virtual space to the user B. Here, when only the virtual space is generated by the user A in operation S2, for example, when a piece of writing is not posted, the virtual space may be provided to the user B, and the first notification 205 may be displayed on the status bar 203 as illustrated in FIG. 2. However, when the user A specifies the individual step and posts a piece of writing in operation S2, the generated virtual space may be provided to the user B, and the third notification 207 may be displayed on the status bar 203 as illustrated in FIG. 2.

In operation S5, when the user B posts a piece of writing or uploads an image in the provided virtual space, an event occurs and the event is transmitted to the server.

In operation S6, the server stores the received event in the virtual space.

In operation S7, when the user A is in the step in which the phone number of the person is being input to the call application, the monitor included in the virtual space application installed and executed in the smartphone of the user A detects that the user A is again in the step identical to the specified individual step and transmits a result of the detecting to the server.

In operation S8, when the server verifies that the user A is in the step identical to the specified individual step of the application for which the virtual space is allowed to be generated, the server provides the generated virtual space to the user A. When the virtual space is provided to the user A, the event generated in the virtual space by the user B in operation S5 may be provided to the user A. In such a case, the virtual space and the event may be provided to the user A, and the third notification 207 may be displayed on the status bar 203 in operation S4. Subsequently, operations S1 through S8 may be repeated based on the event occurring between the user A and the user B.

As described in the foregoing, the virtual space providing system may monitor, using a monitor, an execution and an individual step of an operation of applications provided in a user terminal and thus, immediately generate a virtual space to be shared by users executing and using the applications and provide the virtual space to the users. In addition, the virtual space providing system may immediately generate a virtual space to be shared by users executing a specific individual step of the operation of the application and provide the virtual space to the users.

Thus, the virtual space providing system may execute an application or a program being executed in a user terminal and immediately generate a virtual space to be shared in an individual step, without additionally executing a website or a program providing a service such as a social network service, a chat, or a messenger to share information with another user, or searching for an URL address, and copying and transmitting the found URL address. In addition, when other users execute the individual step, the generated virtual space may be automatically provided to the other users and thus, the users may immediately and conveniently share information and communicate with one another.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

I claim:

1. A virtual space providing system that provides a virtual space to at least one user using a terminal, the system comprising:
    a monitor configured to monitor whether an application or a program comprised in each terminal of the at least one user is executed and a real time operation of the executed application, and output a result of the monitoring;
    a specifier configured to receive the output from the monitor, specify an individual step of the operation of the executed application, and output a request to generate a virtual space for the specified individual step; and
    a space generator configured to receive the output from the specifier and generate the virtual space for the specified individual step, and
    wherein the individual step is each state in which the operation of the executed application changes from a previous state,
    the monitor and the specifier are comprised in a virtual space application to be executed in each terminal,
    the space generator is comprised in a server located to be separate from the terminal, and
    wherein, when an application executed in a terminal of any one of the at least one user is identical to the executed application or performs a function identical to a function of the executed application, and the identical application or the application performing the identical function is in an individual step identical to the specified individual step, the server is configured to provide the generated virtual space to the virtual space application executed in the terminal of any one of the at least one user to share the generated virtual space with any one of the at least one user, and
    wherein the virtual space is controlled through the virtual space application executed in each terminal of the at least one user.

2. The system of claim 1, wherein the application is a web browser, and the individual step is each state in which the operation changes from the previous state after the web browser accesses each uniform resource locator (URL).

3. The system of claim 1, wherein the virtual space is controlled to be a space in which at least one of media comprising music, an image, or a video, and a bulletin board, a file transfer, a recommendation, and a non-recommendation is executed through the virtual space application.

4. The system of claim 1, wherein the virtual space is controlled to be a space in which a program for at least one of a voice chat, a video chat, and a video call to be provided to the at least one user is executed through the virtual space application.

5. The system of claim 1, wherein, when the executed application is a call application of the terminal and the individual step is a step in which a phone number of a contact is stored, the virtual space is provided to the virtual space application executed in a terminal possessing the stored phone number of the contact.

6. The system of claim 5, wherein the virtual space is controlled to be a space in which at least one of media comprising music, an image, or a video, and a bulletin board, and a file transfer is executed through the virtual space application.

7. The system of claim 1, wherein the specifier, the space generator, or the server is configured to generate a unique address specifying the executed application and the individual step, or generate the unique address by modifying a unique web address when the executed application possesses the unique web address.

8. The system of claim 1, wherein the virtual space application is configured to receive an event occurring in the generated virtual space from the server, and provide the received event to any one of the at least one user sharing the provided virtual space, and
    wherein the event is an action of providing data to another user sharing the virtual space through the virtual space application executed in the terminal of any one of the at least one user sharing the virtual space.

9. The system of claim 8, wherein a notification on the received event is provided through the virtual space application executed in a terminal of another user.

10. The system of claim 9, wherein the notification is provided in real time.

11. The system of claim 8, wherein the server is configured to set an access right for a portion of the at least one user sharing the virtual space to access the event, and
    the virtual space application is configured to provide the received event exclusively to the portion of the at least one user corresponding to the access right.

* * * * *